United States Patent
Kim et al.

(10) Patent No.: US 8,054,417 B2
(45) Date of Patent: Nov. 8, 2011

(54) MIRROR EFFECT LIQUID CRYSTAL DISPLAY DEVICE USING REFLECTION POLARIZER

(75) Inventors: Tae-Su Kim, Daejeon (KR); Hyun-Woo Shin, Gwacheon-si (KR); Bu-Gon Shin, Daejeon (KR); Jac-Jin Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 218 days.

(21) Appl. No.: 12/310,785

(22) PCT Filed: Sep. 7, 2007

(86) PCT No.: PCT/KR2007/004330
§ 371 (c)(1),
(2), (4) Date: Mar. 6, 2009

(87) PCT Pub. No.: WO2008/030059
PCT Pub. Date: Mar. 13, 2008

(65) Prior Publication Data
US 2010/0020272 A1    Jan. 28, 2010

(30) Foreign Application Priority Data
Sep. 8, 2006    (KR) .................. 10-2006-0086571

(51) Int. Cl.
*G02F 1/1335*    (2006.01)
(52) U.S. Cl. ............................................. 349/96
(58) Field of Classification Search .......... 349/96, 349/114, 119–120; 359/487, 486, 495
See application file for complete search history.

(56) References Cited

U.S. PATENT DOCUMENTS

| | | | | |
|---|---|---|---|---|
| 5,422,756 | A * | 6/1995 | Weber | 359/485.03 |
| 6,111,696 | A * | 8/2000 | Allen et al. | 359/495 |
| 6,447,120 | B1 * | 9/2002 | Hansen et al. | 353/20 |
| 6,813,077 | B2 * | 11/2004 | Borrelli et al. | 359/484.03 |
| 6,975,455 | B1 * | 12/2005 | Kotchick et al. | 359/487 |
| 7,088,405 | B2 * | 8/2006 | Kotchick et al. | 349/114 |
| 7,561,332 | B2 * | 7/2009 | Little et al. | 359/485.05 |
| 7,646,453 | B2 * | 1/2010 | Kowarz et al. | 349/96 |
| 2004/0218124 | A1 * | 11/2004 | Mi et al. | 349/117 |
| 2007/0064163 | A1 * | 3/2007 | Tan et al. | 349/5 |

FOREIGN PATENT DOCUMENTS

| | | |
|---|---|---|
| KR | 2001-0045641 | 6/2001 |
| KR | 2001-0110849 | 12/2001 |
| KR | 2002-0057218 | 7/2002 |

* cited by examiner

*Primary Examiner* — Akm Ullah
(74) *Attorney, Agent, or Firm* — McKenna Long & Aldridge LLP

(57) ABSTRACT

An LCD (Liquid Crystal Display) device includes a backlight unit, a lower polarizer positioned on the backlight unit, a liquid crystal layer positioned on the lower polarizer, and an upper reflection polarizer positioned on the liquid crystal layer. The upper reflection polarizer is configured such that a regularly arranged metallic line lattice is formed on a support. this LCD device may give a good mirror effect when power is intercepted, and also give a clear display with high brightness even at a bright place when power is supplied to operate the LCD device.

16 Claims, 3 Drawing Sheets

[Figure 1]     PRIOR ART
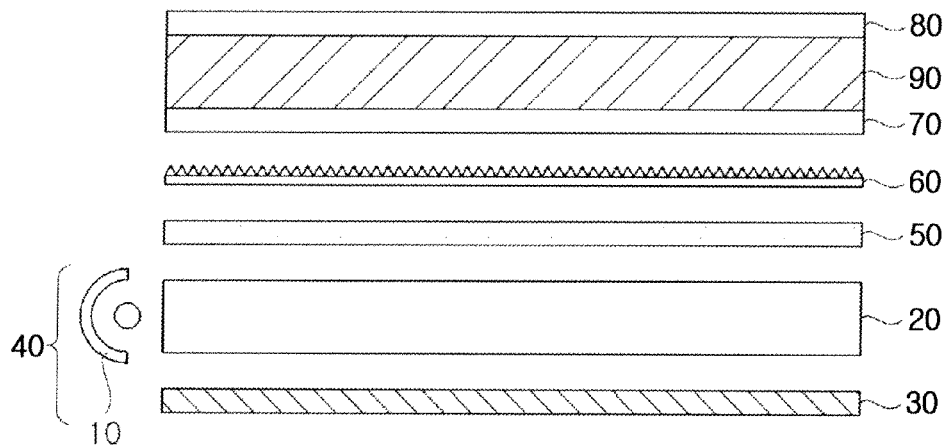
[Figure 2]
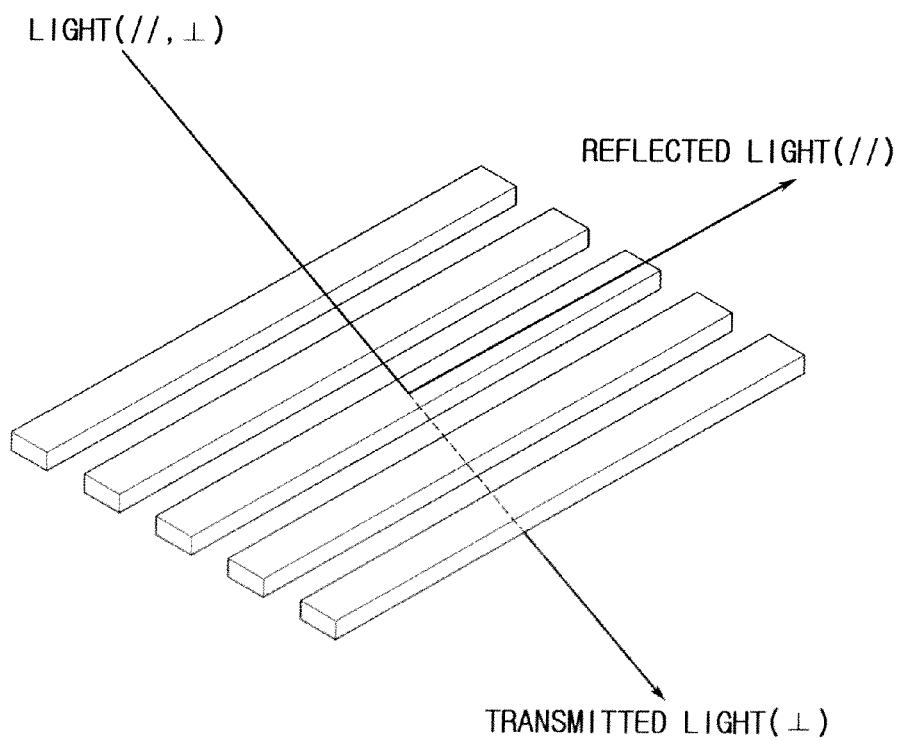

[Figure 3]
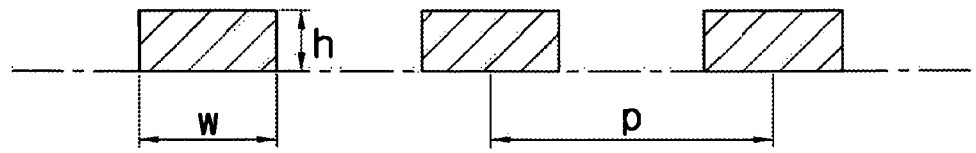
[Figure 4]
(a)
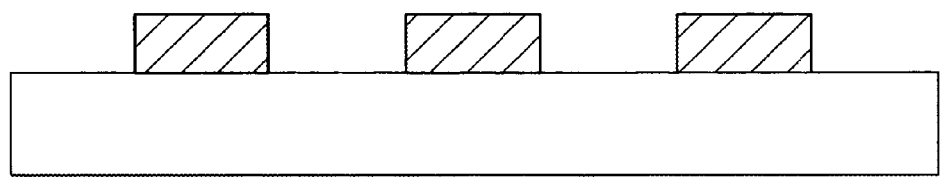
(b)
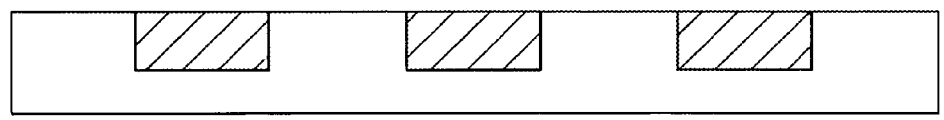
(c)
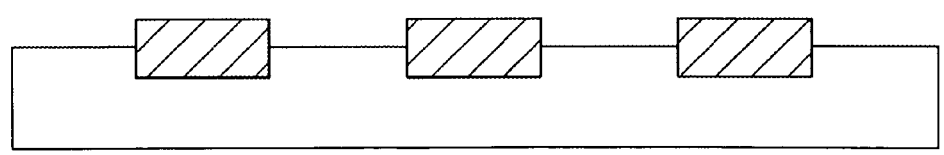
(d)
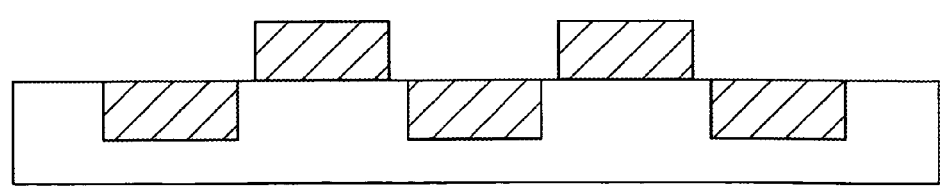

[Figure 5]
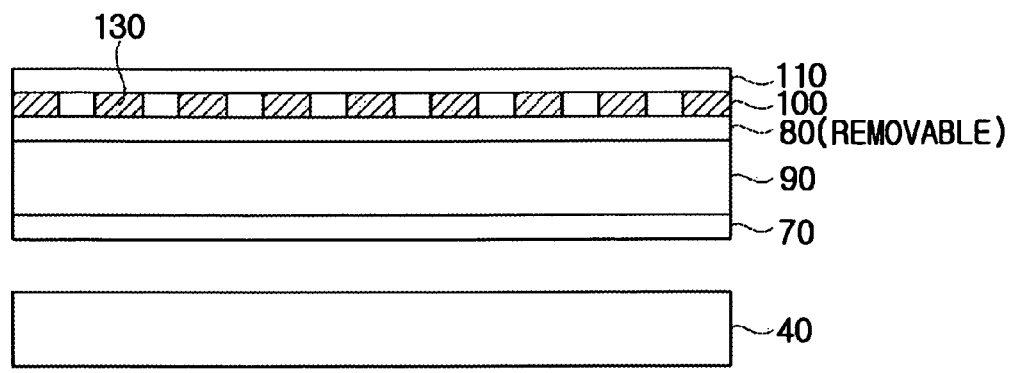
[Figure 6]
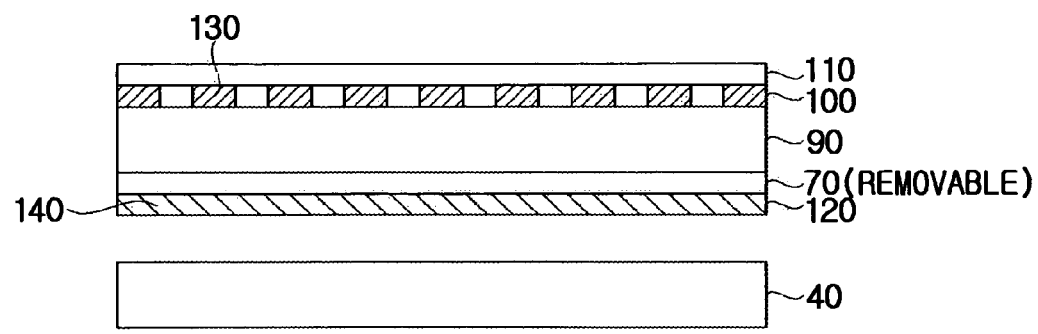

MIRROR EFFECT LIQUID CRYSTAL DISPLAY DEVICE USING REFLECTION POLARIZER

This application claims priority to International Application No. PCT/KR2007/004330 filed on Sep. 7, 2007 which claims priority to Korean Patent Application No. 2006-0086571 filed on Sep. 8, 2006, both of which are incorporated by reference, as if fully set forth herein.

BACKGROUND ART

An LCD (Liquid Crystal Display) forms an electric field in a liquid crystal layer to change a pattern of polarized light passing through it such that it may use the phenomenon that light selectively passes through it.

At an initial stage, LCD devices are generally applied to a small single-color display of an electronic calculator or a clock. However, along with the progress of LCD techniques, LCD devices are at the present used for large color displays due to the development of AM-TFT technology.

In addition, consumers of LCD devices demand not only excellent quality of display that gives clear pictures with a high contrast ratio, high brightness, wide range of view, and prevention of leakage of light, but also harmonization with surroundings even when power is not applied thereto and other additional functions.

To cope with such demands, there was an attempt to provide a LCD device having a mirror surface to act as a mirror when power is intercepted. That is to say, a reflector film coated with a thin metal layer that ensures transmission of light is attached to a surface of a LCD device to form a mirror surface. However, the metal layer included in the reflector film shows a seriously lowered ratio of transmitted light, namely low transmittance, rather than the case not including the metal layer, though it allows transmission of light. As a result, brightness of images delivered to observers from a backlight is not sufficient, so a display screen is not well visible when it is observed at a bright place.

In other words, in case of using a conventional reflector film, the LCD device may give a good mirror effect when power is intercepted, but when power is supplied to the LCD device to display images, the LCD device may not give clear pictures at a bright place due to a reduced contrast caused by inefficient brightness.

Thus, many efforts are continuously made to develop a display device capable of giving a sufficient mirror effect when power is intercepted and also capable of giving a clear display even at a bright place by ensuring sufficient screen brightness when power is supplied thereto.

Meanwhile, a LCD device has very low luminance efficiency since the light reaching eyes of an observer is not greater than 10% of the light emitted from a light source due to the natures of the device.

FIG. 1 is a sectional view schematically showing a conventional LCD device. Referring to FIG. 1, the LCD device includes a light source 10, a backlight unit 40 composed of a light guide plate 20 for transferring a light emitted from the light source 10 and a reflection plate 30 for reflecting the light transferred from the light guide plate toward an observer, a diffusion plate 50 for uniformly diffusing the light reflected by the reflection plate 30 to enhance uniformity, a prism sheet 60 for enhancing brightness of light, a lower polarizer 70 for passing light only in one direction among lights oscillating in various directions, a liquid crystal layer 90 for changing a polarization state of light by changing arrangement of the light passing through the lower polarization plate 70 according to supply of power, and an upper polarizer 80 for passing or intercepting the light transferred from the liquid crystal layer 90 according to the polarization state of light.

In the LCD device, the liquid crystal layer 90 determines transmission and absorption of light using a polarizing phenomenon. Thus, the polarizer intercepts 50% of light emitted upward through the backlight unit 40, and at least ⅔ of remaining light is absorbed in a color filter. In this way, the light is absorbed in other film layers, so just 10% or less of the lights emitted from a light source may reach eyes of an observer.

Thus, in order to realize good quality of display, it is needed to transfer the light emitted from the light source 10 to eyes of an observer at a greatest efficiency. The clearness of display may be represented by a contrast ratio, and a contrast ratio at a bright place (a bright room) may be expressed using the following equation 1.

$$\text{CONTRAST RATIO (BRIGHT ROOM)} = \frac{\text{BRIGHTNESS OF WHITE LIGHT} + \text{BRIGHTNESS OF EXTERNAL REFLECTED LIGHT}}{\text{BRIGHTNESS OF BLACK LIGHT} + \text{BRIGHTNESS OF EXTERNAL REFLECTED LIGHT}} \quad \text{Equation 1}$$

Seeing the equation 1, it would be understood that, in case a white light has a low brightness, the brightness of an external reflected light gives an increased influence on a contrast ratio, so the contrast ratio may be greatly lowered. Thus, it would reach a conclusion that, if the brightness of the external reflected light is out of control, enhancing brightness of a white light is required for increasing the contrast ratio and thus obtaining a clear quality of display, and also it is required to reduce light leakage such that the brightness of a black light is kept as lower as possible.

Luminance efficiency (namely, a ratio of light reaching eyes of an observer among emitted light) is increased if power supplied to the backlight unit 40 is raised since an amount of light emitted from the backlight unit 40 is increased. However, in a mobile display using a battery (e.g., a cellular phone, a notebook, and PDP), a battery may be rapidly discharged if power supplied to the backlight unit is raised to increase luminance efficiency.

In order to solve the problem of luminance efficiency reduction caused by inherent features of a LCD device, namely the problem that the polarizer absorbs and intercepts a significant amount of light to lower luminance efficiency, 3M proposed DBEF (Dual Brightness Enhancement Film). This DBEF is a reflection polarizer having polymer thin films in multi layers. When being applied to a transmissive LCD, the DBEF is positioned between a backlight unit and a LCD panel to substitute or supplement the lower polarizer 70 of FIG. 1. While a conventional absorption polarizer absorbs light not passing through the polarizer to lower luminance efficiency, the DBEF reflects the light not passing through the polarizer into a lower direction such that the reflected light is reflected on the reflection plate 30 (FIG. 1) again and then reaches the DBEF with a changed polarization direction to pass through the DBEF. Thus, even a light with polarization unsuitable for the polarization condition of the DBEF may be utilized with a changed polarization state. In this way, it was reported that efficiency may be increased about 60% rather than a conventional case.

However, the DBEF is expensive since anisotropic polymer films and isotropic polymer films are optically laminated alternately. Also, the DBEF shows deteriorated reflection efficiency since the reflection efficiency is greatly changed depending on a direction of incident light, and a manufacturing process of the DBEF is very complicated. In addition, the DBEF may enhance brightness, but it may not give a minor effect intended by the present invention.

DISCLOSURE

Technical Problem

The present invention is designed in consideration of the above problems, and therefore it is an object of the invention to provide a LCD device capable of giving a good mirror effect when power is intercepted and also capable of giving a clear display quality using enhanced brightness even at a bright place when power is applied to the device.

Technical Solution

In order to accomplish the above object, the present invention provides a LCD (Liquid Crystal Display) device, which includes a backlight unit; a lower polarizer positioned on the backlight unit; a liquid crystal layer positioned on the lower polarizer; and an upper reflection polarizer positioned on the liquid crystal layer, wherein the upper reflection polarizer is configured such that a regularly arranged metallic line lattice is formed on a support.

In the present invention, the metallic line lattice preferably has a pattern selected from the group consisting of: being coated on the support and protruded thereon; being buried in a groove formed in the support; being partially buried in the support and partially protruded thereon; and being partially buried in the support and partially protruded thereon such that buried portions and protruded portions are alternately arranged.

Preferably, the support has a single structure selected from the group consisting of a transparent film, a retardation film, an absorption polarizer and a substrate of a liquid crystal panel, or a multi-layered structure having at least two in combination selected therefrom. In case the support is an absorptive upper polarizer, a transmission axis of the metallic line lattice is preferably identical to a transmission axis of the absorptive upper polarizer.

In the present invention, the metallic line lattice may have a rectangular, trapezoidal, parallelogrammic, triangular or circular section.

Preferably, the metallic line lattice has a section whose width to height ratio is 1:1/2 to 1:5. More preferably, the metallic line lattice has a section whose width to height ratio is 1:1 to 1:3.

Preferably, the metallic line lattice has a section whose width is 20 to 70% of an arrangement period of the metallic line lattice. Also, the metallic line lattice preferably has an arrangement period of 300 nm or less, more preferably 200 nm or less.

In the present invention, the reflection polarizer may be positioned at an uppermost portion of the LCD device, and in case the metallic line lattice is formed on the support to be exposed out, it is effective to additionally form a protective film on the metallic line lattice. In this case, the protective film may be made of material selected from the group consisting of PMMA (polymethyl methacrylate), TAC (tri-acetyl cellulose), PVA (polyvinyl alcohol), PI (polyimide), PET (polyethylene terephthalate), PEN (polyethylene naphthalate), PES (polyether sulphones), PC (polycarbonate) and COP (cyclic olefin polymer).

In the present invention, the lower polarizer may be a lower reflection polarizer configured such that a regularly arranged metallic line lattice is formed on a support.

In this case, the lower polarizer may adopt any pattern of the upper reflection polarizer. Also, material of the support and the metallic line lattice, and w/h ratio and arrangement period of the metallic line lattice are identical to those of the upper reflection polarizer.

Preferably, in case the upper and lower reflection polarizers are provided to the LCD device at the same time, a transmission axis of the upper reflection polarizer is perpendicular to a transmission axis of the lower reflection polarizer.

DESCRIPTION OF DRAWINGS

These and other features, aspects, and advantages of preferred embodiments of the present invention will be more fully described in the following detailed description, taken accompanying drawings. In the drawings:

FIG. 1 is a schematic sectional view showing a conventional LCD device;

FIG. 2 is a conceptual diagram showing the phenomenon that a light input to a metallic line lattice is transmitted as a vertical light or reflected as a horizontal light respectively;

FIG. 3 is a sectional view illustrating standards of a metallic line lattice;

FIG. 4 is a sectional view showing that a metallic line lattice is formed on a support in various ways;

FIG. 5 is a sectional view showing a LCD device adopting an upper reflection polarizer; and FIG. 6 is a sectional view showing a LCD device adopting upper and lower reflection polarizers together.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Inventors of the present invention deeply studied to solve the problem of lowered transmittance of a conventional reflector film, and then revealed that it is preferred to arrange an upper reflection polarizer having a metallic line lattice as shown in FIG. 2 on an upper surface of a LCD device.

Referring to FIG. 2, an upper reflection polarizer employed in the present invention has a regularly arranged metallic line lattice, differently from a conventional polarizer made of anisotropic material (hereinafter, such a conventional polarizer will be referred to as an absorption polarizer). The reflection polarizer configured as above causes polarization using fine gaps among the metallic line lattice while power is supplied to the LCD device. Meanwhile, when power is intercepted, the reflection polarizer gives a mirror effect by reflecting a significant part of light incident from outside.

That is to say, if the metallic line lattice is regularly arranged as shown in FIG. 2, among the light incident to the metallic line lattice, a component (or, a horizontal light) incident in parallel with a plane where the metallic line lattice is placed is intercepted by the metallic line lattice, but a component (or, a vertical light) incident perpendicularly to the plane where the metallic line lattice is placed passes through the metallic line lattice. Thus, the regularly arranged metallic line lattice has the same role as a conventional polarizer. Also, since the metallic line lattice has metal properties, light incident to a surface of the metallic line lattice is reflected. Thus, when power is intercepted, the reflection polarizer may act as a mirror surface.

In addition, among the light reaching the upper reflection polarizer, light not transmitting through the polarizer may be reflected downward by the metallic line lattice and then reflected again on a reflective plate of a backlight unit to be supplied upward. Thus, though the same light source is used, the present invention may enhance brightness by increasing an amount of light capable of being emitted out, and as a result it is possible to realize a clear display quality even at a bright place.

The upper reflection polarizer having a metallic line lattice as mentioned above may be formed in a way of regularly arranging the metallic line lattice on a transparent support (e.g., film or plate) having at least one layer. The transparent support may adopt a commonly used one, but an optical film such as a retardation film or a substrate of a liquid crystal panel may also be used as the support.

The metallic line lattice may be coated on the support and protruded thereon as shown in FIG. 4a, buried in a groove formed in the support as shown in FIG. 4b, partially buried in the support and partially protruded thereon as shown in FIG. 4c, or partially buried in the support and partially protruded thereon such that buried portions and protruded portions are alternately arranged as shown in FIG. 4d.

The upper reflection polarizer may be used in single to act as a polarizer, but it may also be laminated on an existing absorption polarizer. In this case, leakage of light may be further reduced. In case the upper reflection polarizer is arranged on an absorptive upper polarizer, the absorptive upper polarizer may also act as a support. However, the absorptive upper polarizer preferably has a transmission axis substantially identical to a transmission axis of the upper reflection polarizer. Meanwhile, it would be apparent to those having ordinary skill in the art that a transparent film or another optical film may be added between the absorptive upper polarizer and the upper reflection polarizer in order to improve optical features of a LCD device.

The transparent film may be made of PMMA (polymethyl methacrylate), TAC (tri-acetyl cellulose), PVA (polyvinyl alcohol), PI (polyimide), PET (polyethylene terephthalate), PEN (polyethylene naphthalate), PES (polyether sulphones), PC (polycarbonate) and COP (cyclic olefin polymer), and the material of the transparent film and the polarizer may be selected and used by those having ordinary skill in the art as desired, so it is not described in detail here.

The metallic line lattice included in the upper reflection polarizer preferably has a section whose width-height ratio (or, w/h ratio) is 1:1/2 or above, more preferably 1:1 or above. Also, the w/h ratio is preferably kept not greater than 1:5, more preferably not greater than 1:3. If the w/h ratio of the polarizer exceeds the above numerical range, the difference of transmittances of vertical and horizontal lights is reduced, so the upper reflection polarizer may not act as a polarizer. Meanwhile, if the w/h ratio of the polarizer is lower than the above numerical range, the light transmittance is lowered, thereby deteriorating the brightness of display. Here, the width of the section of the metallic line lattice is defined as a line width of a metallic line of the metallic line lattice. The section of the metallic line lattice may have a rectangular, trapezoidal, parallelogrammic, triangular or circular shape, and other various shapes may also be adopted.

The width of the metallic line lattice is preferably 20 to 70% based on an arrangement period of the metallic line lattice. If the width of the metallic line lattice is less than 20%, polarization splitting of light is deteriorated, so the upper reflection polarizer may not be used as a polarizer. If the width exceeds 70%, the transmission of light is deteriorated, thereby deteriorating the brightness of display.

In order to ensure sufficient polarization by the metallic line lattice, the arrangement period (p) of the metallic line lattice is preferably 300 nm or less. Also, in order to ensure a wide range of view, the arrangement period (p) of the metallic line lattice is more preferably 200 nm or less.

For facilitating reflection of light in a visible range, the metallic line lattice is preferably made of silver or aluminum, but not limitedly. The metallic line lattice may be formed on the support in the following ways depending on the cases that its section is protruded on the support, buried therein, or disposed in combination thereof.

In case the metallic line lattice has a protruded shape, metal is deposited on the support, and then an anti-reflection film is coated thereon in order to prevent a light exposure efficiency from being deteriorated due to reflection. And then, a photoresist (P/R) layer is coated on the anti-reflection film, and a metallic line lattice pattern is formed using various kinds of etching (dry etching or wet etching) after light exposure and development. And then, the anti-reflection film is removed using RIE (Reactive Ion Etching) or an anti-reflection film coating removing solution, and then the metallic line lattice having a protruded shape is formed on the support. Meanwhile, a protective film may be additionally formed on a front surface of the support on which the metallic line lattice is formed.

Now, a method for forming a metallic line lattice having a buried shape is explained. First, an anti-reflection film is coated on the support, and then a P/R layer is coated thereon. After that, a groove having a metallic line lattice pattern is concavely formed in the support through light exposure, development and etching. And then, metal is deposited in the concave groove, and the anti-reflection film is removed using RIE or a coating removing solution. As an alternative, without removing the P/R layer used in forming the concave groove, after metal is deposited on the front surface of the support, the P/R layer may be lifted off to remove the P/R layer and metals deposited in a region other than the concave groove, thereby forming the metallic line lattice having a buried shape. Preferably, in depositing metal, a deposition thickness of the metal is controlled to be substantially identical to a depth of the concave groove pattern.

Meanwhile, the metallic line lattice partially buried in the support and partially protruded on the support may be formed in a way of controlling a deposition thickness of metal when the above buried metallic line lattice is formed. That is to say, if the deposition thickness of metal is controlled to be greater than the depth of the concave groove, the metallic line lattice may be partially buried in the support and partially protruded on the support. In addition, the metallic line lattice in which the protruded metallic line lattice and the buried metallic line lattice are alternated may be formed in a way of firstly forming the buried metallic line lattice and then secondarily forming the protruded metallic line lattice. The method for forming the buried or protruded metallic line lattice is already explained above, so its explanation is not repeated here.

The metallic line lattice may be formed using imprinting or roll printing in addition to photolithography. Such a patterning process is well known in the art, and thus it is not explained in detail here.

If the upper reflection polarizer is used as a substitute for an upper polarizer of a LCD device or arranged on the upper polarizer, light having already passed through a transparent support and a liquid crystal may pass through the metallic line lattice. In addition, the light incident on the metallic line lattice is reflected downward and then reflected again upward through the reflection plate of the backlight unit, thereby decreasing loss of light and thus giving a display quality with better brightness. In addition, when power supplied to the display device is intercepted, the light incident from outside is reflected on the metallic line lattice, thereby giving a mirror effect.

The upper reflection polarizer may be applied to a structure in which the support is formed below and the metallic line lattice is oriented upward, or vice versa. However, the metallic line lattice may show a problem in its durability when it is exposed upward, so a protective film is preferably coated on a front surface of the support. The protective film may be made of PMMA, TAC, PVA, PI, PET, PEN, PES, PC or COP. However, the present invention is not limited thereto.

FIG. 5 is a sectional view schematically showing a LCD device adopting the above upper reflection polarizer. Referring to FIG. 5, the LCD device includes a backlight unit 40, a lower polarizer 70, a liquid crystal layer 90, an upper polarizer 80 and an upper reflection polarizer 100. Here, since the upper reflection polarizer 100 may act as the upper polarizer 80 in itself, the upper polarizer 80 may be excluded. A protective film 110 is formed on the upper reflection polarizer 100, and the protective film 110 may be excluded depending on an arrangement direction of the metallic line lattice based on the support.

Generally, the upper polarizer 80 and the lower polarizer 70 have transmission axes perpendicular to each other in a LCD device, so the upper reflection polarizer 100 and the lower polarizer 70 preferably have transmission axes perpendicular to each other.

The LCD device shown in FIG. 5 may further include a prism sheet, a diffusion plate or another optical film, which is included in a general LCD device, in addition to the above components in order to improve brightness, as apparent to those having ordinary skill in the art.

Meanwhile, in order to further improve an efficiency of using light emitted from the backlight unit, it is possible to substitute the lower polarizer with a reflection polarizer or arrange a reflection polarizer below the lower polarizer. Then, an efficiency of using light emitted from the backlight unit is greatly improved, thereby enhancing brightness of the LCD device. A horizontal light (II) not transmitting through the metallic line lattice of the reflection polarizer does not disappear by absorption into the metallic line lattice, but it is reflected toward the reflection plate of the backlight unit to reach the polarizer with a changed polarization state. At this time, if the polarization state is suitable for passing through the polarizer, the light is emitted out of the liquid crystal toward an observer.

Hereinafter, for the convenient explanation, a reflection polarizer substituted with the lower polarizer or arranged below the lower polarizer will be called 'a lower reflection polarizer' in general.

FIG. 6 is a sectional view schematically showing a LCD device adopting the lower reflection polarizer. Referring to FIG. 6, the LCD device includes a backlight unit 40, a lower reflection polarizer 120, a lower polarizer 70, a liquid crystal layer 90, and an upper reflection polarizer 100. A protective film 110 is formed on the upper reflection polarizer 100, but the protective film 110 may be excluded depending on an arrangement direction of the metallic line lattice. In FIG. 6, it is illustrated that an upper polarizer is excluded, but it would be apparent to those having ordinary skill in the art that the upper polarizer may be interposed between the liquid crystal 90 and the upper reflection polarizer 100.

The structure of the lower reflection polarizer 120, material of the support and the metallic line lattice, and w/h ratio and arrangement period of the metallic line lattice are substantially identical to those of the upper reflection polarizer explained based on FIG. 4. Meanwhile, in case the lower reflection polarizer 120 is arranged below the lower polarizer 70, it is preferred that the lower polarizer 70 and the lower reflection polarizer 120 have polarization axes substantially identical to each other. In addition, the upper reflection polarizer 100 and the lower reflection polarizer 120 preferably have polarization axes perpendicular to each other. The lower reflection polarizer 120 is not exposed out, so it is not essential to form a protectively film on a front surface of the support regardless of a direction of the formed metallic line lattice based on the support.

The LCD device shown in FIG. 6 may further include a prism sheet, a diffusion plate or another optical film, which is included in a general LCD device, in addition to the above components in order to improve brightness, as apparent to those having ordinary skill in the art.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

In one aspect, the LCD device according to the present invention may give a good mirror effect when power is intercepted, and also give a clear display with high brightness even at a bright place when power is supplied to operate the LCD device.

In another aspect, the LCD device according to the present invention may more efficiently use light emitted from a light source since the upper and lower reflection polarizers are used at once, so a smaller amount of power is consumed in providing the same clearness.

The invention claimed is:

1. A LCD (Liquid Crystal Display) device, comprising:
a backlight unit;
a lower polarizer positioned on the backlight unit;
a liquid crystal layer positioned on the lower polarizer; and
an upper reflection polarizer positioned on the liquid crystal layer,
wherein the upper reflection polarizer is configured such that a regularly arranged metallic line lattice is formed on a support,
wherein the metallic line lattice has a pattern selected from the group consisting of:
being coated on the support and protruded thereon;
being buried in a groove formed in the support;
being partially buried in the support and partially protruded thereon; and
being partially buried in the support and partially protruded thereon such that buried portions and protruded portions are alternately arranged.

2. The LCD device according to claim 1,
wherein the support has a single structure selected from the group consisting of a transparent film, a retardation film, an absorption polarizer and a substrate of a liquid crystal panel, or a multi-layered structure having at least two in combination selected therefrom.

3. The LCD device according to claim 2,
wherein, in case the support is an absorptive upper polarizer, a transmission axis of the metallic line lattice is identical to a transmission axis of the absorptive upper polarizer.

4. The LCD device according to claim 1,
wherein the metallic line lattice has a rectangular, trapezoidal, parallelogrammic, triangular or circular section.

5. The LCD device according to claim 4,
wherein the metallic line lattice has a section whose width to height ratio is 1:1/2 to 1:5.

6. The LCD device according to claim 5,
wherein the metallic line lattice has a section whose width to height ratio is 1:1 to 1:3.

7. The LCD device according to claim 1,
wherein the metallic line lattice has a section whose width is 20 to 70% of an arrangement period of the metallic lattice.

8. The LCD device according to claim 1,
wherein the metallic line lattice has an arrangement period of 300 nm or less.

9. The LCD device according to claim 8,
wherein the metallic line lattice has an arrangement period of 200 nm or less.

10. The LCD device according to claim 1,
wherein the reflection polarizer is positioned at an uppermost portion of the LCD device, and
wherein the metallic line lattice is positioned at an outer side based on the support, and a protective film is formed on a front surface of the support.

11. The LCD device according to claim 10,
wherein the protective film is made of material selected from the group consisting of PMMA (polymethyl methacrylate), TAC (tri-acetyl cellulose), PVA (polyvinyl alcohol), PI (polyimide), PET (polyethylene terephthalate), PEN (polyethylene naphthalate), PES (polyether sulphones), PC (polycarbonate) and COP (cyclic olefin polymer).

12. The LCD device according to claim 1,
wherein the lower polarizer is a lower reflection polarizer configured such that a regularly arranged metallic line lattice is formed on a support.

13. The LCD device according to claim 12, wherein the metallic line lattice in the lower reflection polarizer has a pattern selected from the group consisting of:
being coated on the support and protruded thereon;
being buried in a groove formed in the support;
being partially buried in the support and partially protruded thereon; and
being partially buried in the support and partially protruded thereon such that buried portions and protruded portions are alternately arranged.

14. The LCD device according to claim 12,
wherein the support has a single structure selected from the group consisting or a transparent film, a retardation film, an absorption polarizer and a substrate of a liquid crystal panel, or a multi-layered structure having at least two in combination selected therefrom.

15. The LCD device according to claim 13,
wherein the support is an absorptive lower polarizer, and a transmission axis of the metallic line lattice is identical to a transmission axis of the absorptive lower polarizer.

16. The LCD device according to claim 12,
wherein a transmission axis of the upper reflection polarizer is perpendicular to a transmission axis of the lower reflection polarizer.

* * * * *